US010700333B2

(12) United States Patent
Choi et al.

(10) Patent No.: US 10,700,333 B2
(45) Date of Patent: Jun. 30, 2020

(54) SEPARATOR FOR SECONDARY BATTERY AND LITHIUM SECONDARY BATTERY COMPRISING SAME

(71) Applicant: SAMSUNG SDI CO., LTD., Yongin-si, Gyeonggi-do (KR)

(72) Inventors: Hyeonsun Choi, Suwon-si (KR); Keewook Kim, Suwon-si (KR); Jinkyu Park, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 11 days.

(21) Appl. No.: 16/067,809

(22) PCT Filed: Oct. 14, 2016

(86) PCT No.: PCT/KR2016/011536
§ 371 (c)(1),
(2) Date: Jul. 2, 2018

(87) PCT Pub. No.: WO2017/122908
PCT Pub. Date: Jul. 20, 2017

(65) Prior Publication Data
US 2019/0013504 A1 Jan. 10, 2019

(30) Foreign Application Priority Data
Jan. 15, 2016 (KR) .......... 10-2016-0005446

(51) Int. Cl.
H01M 2/16 (2006.01)
H01M 10/052 (2010.01)
H01M 10/0525 (2010.01)

(52) U.S. Cl.
CPC .......... H01M 2/1686 (2013.01); H01M 2/16 (2013.01); H01M 2/166 (2013.01);
(Continued)

(58) Field of Classification Search
CPC .. H01M 2/1653; H01M 2/166; H01M 2/1686; H01M 10/052
(Continued)

(56) References Cited

U.S. PATENT DOCUMENTS

2008/0050654 A1* 2/2008 Stevanovic ........... H01M 4/136
429/221
2012/0115029 A1* 5/2012 Carlson ................ H01M 2/166
264/104
(Continued)

FOREIGN PATENT DOCUMENTS

JP 2013-122009 6/2013
JP 2015-502636 1/2015
(Continued)

OTHER PUBLICATIONS

Machine translation of KR 101455043 (no date).*
(Continued)

Primary Examiner — Amanda C. Walke
(74) Attorney, Agent, or Firm — Lewis Roca Rothgerber Christie LLP

(57) ABSTRACT

The present invention relates to a separator for a secondary battery and a lithium secondary battery comprising the same, wherein the separator comprises a porous substrate and a heat-resistant porous layer positioned on at least one surface of the porous substrate, the heat-resistant porous layer comprising a first binder, a second binder, and a filler, the first binder comprising a copolymer having: a first structural unit derived from a first fluorine monomer; a second structural unit derived from a second fluorine monomer; and a third structural unit derived from a monomer comprising at least one functional group selected from a hydroxyl group, a carboxyl group, an ester group, an acid anhydride group, and a derivative thereof, the second binder
(Continued)

comprising at least one of a vinylidene fluoride homopolymer and a vinylidene fluoride copolymer.

11 Claims, 1 Drawing Sheet

(52) U.S. Cl.
CPC ....... *H01M 2/1646* (2013.01); *H01M 2/1653* (2013.01); *H01M 10/052* (2013.01); *H01M 10/0525* (2013.01)

(58) Field of Classification Search
USPC .......................................................... 429/144
See application file for complete search history.

(56) References Cited

U.S. PATENT DOCUMENTS

| | | | | |
|---|---|---|---|---|
| 2013/0023620 | A1* | 1/2013 | Abusleme | C08F 8/00 |
| | | | | 524/546 |
| 2015/0017532 | A1 | 1/2015 | Iguchi et al. | |
| 2015/0140404 | A1* | 5/2015 | Yoo | H01M 2/1653 |
| | | | | 429/145 |
| 2015/0155539 | A1 | 6/2015 | Park et al. | |
| 2015/0303003 | A1* | 10/2015 | Ha | H01G 11/52 |
| | | | | 429/400 |
| 2015/0303427 | A1* | 10/2015 | Hyun | H01M 2/145 |
| | | | | 429/145 |
| 2015/0372274 | A1* | 12/2015 | Hamon | H01M 2/145 |
| | | | | 429/144 |
| 2016/0204405 | A1* | 7/2016 | Hamon | H01M 2/145 |
| | | | | 429/144 |
| 2017/0338460 | A1* | 11/2017 | Kim | C09J 7/30 |
| 2018/0034025 | A1* | 2/2018 | Lee | H01M 2/145 |
| 2018/0315971 | A1* | 11/2018 | Kwon | H01M 2/16 |
| 2018/0358596 | A1* | 12/2018 | Woo | B32B 27/00 |
| 2019/0029177 | A1* | 1/2019 | Enns | A01D 43/077 |
| 2019/0088985 | A1* | 3/2019 | Cheng | H01G 9/02 |
| 2019/0245183 | A1* | 8/2019 | Jeong | C09D 7/45 |

FOREIGN PATENT DOCUMENTS

| | | |
|---|---|---|
| JP | 5757363 | 7/2015 |
| KR | 10-2009-0056811 | 6/2009 |
| KR | 10-2010-0016468 | 2/2010 |
| KR | 10-2014-0012037 | 1/2014 |
| KR | 10-2014-0051218 | 4/2014 |
| KR | 10-2014-0051258 | 4/2014 |
| KR | 10-2014-0051259 | 4/2014 |
| KR | 10-2014-0066786 | 6/2014 |
| KR | 101455043 B1 * | 10/2014 |
| KR | 10-1475791 | 12/2014 |
| KR | 10-2015-0001148 | 1/2015 |
| KR | 10-2015-0004371 | 1/2015 |
| KR | 10-2015-0015918 | 2/2015 |
| KR | 10-2015-0091897 | 8/2015 |
| KR | 10-1551757 | 9/2015 |
| WO | WO 2014/079861 A1 | 5/2014 |
| WO | WO 2014/086906 A1 | 6/2014 |
| WO | WO 2014/095907 A1 | 6/2014 |

OTHER PUBLICATIONS

Machine translation of KR1020150091897 (no date).*
Machine translation of WO 2015/083790 (no date).*
EPO Extended Search Report dated Jul. 5, 2019, for corresponding European Patent Application No. 16885219.2 (7 pages).

* cited by examiner

【Figure 1】
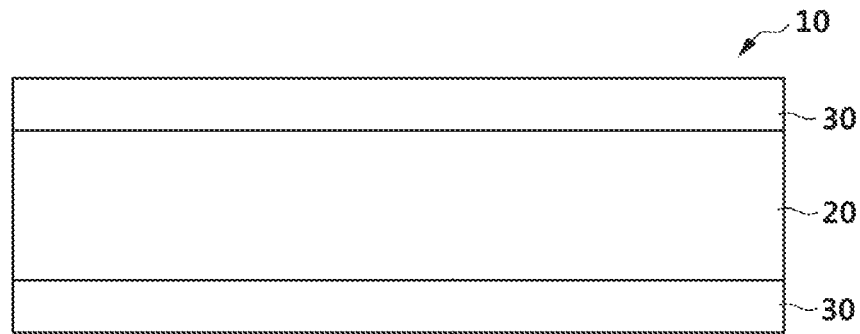
【Figure 2】
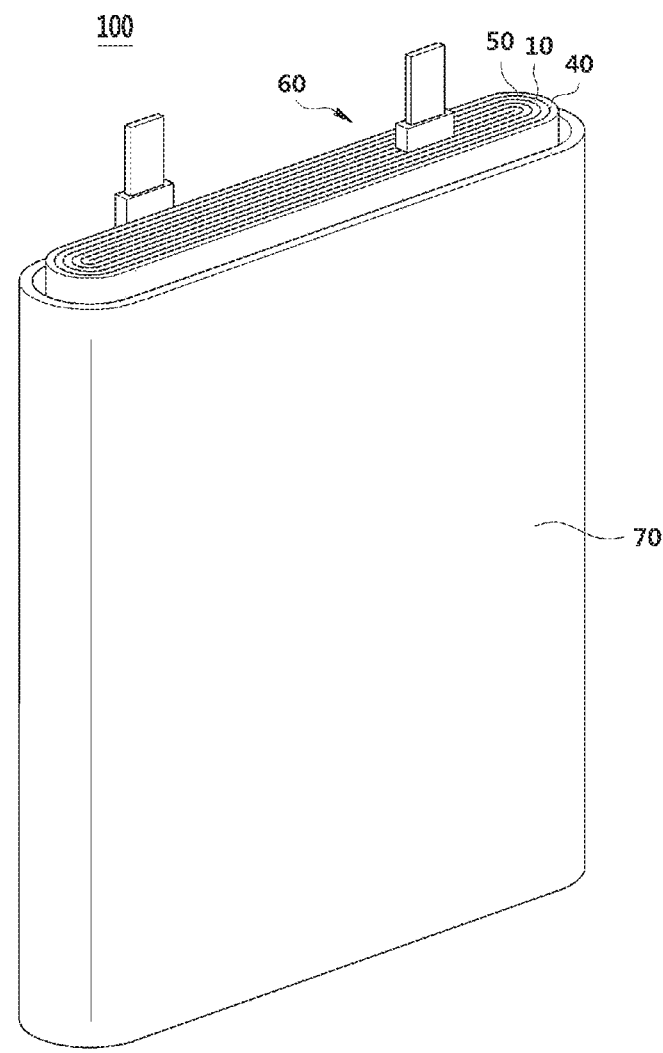

SEPARATOR FOR SECONDARY BATTERY AND LITHIUM SECONDARY BATTERY COMPRISING SAME

CROSS-REFERENCE TO RELATED APPLICATION(S)

This application is a National Phase Patent Application and claims priority to and the benefit of International Application Number PCT/KR2016/011536, filed on Oct. 14, 2016, which claims priority to Korean Patent Application Number 10-2016-0005446, filed on Jan. 15, 2016, the entire contents of all of which are incorporated herein by reference.

TECHNICAL FIELD

A separator for a secondary battery and a lithium secondary battery including the same are disclosed.

BACKGROUND ART

A separator for an electrochemical battery is an intermediate film that separates a positive electrode and a negative electrode in a battery, and maintains ion conductivity continuously to enable charge and discharge of a battery.

Recently, a separator keeps being required of excellent battery stability about exothermicity, as a battery tends to be lighter and down-sized and keeps requiring of high capacity as a power source having high power/large capacity for the electric vehicle. Accordingly, a separator may include a heat-resistance porous layer, and thus adherence and durability of the heat-resistance porous layer are important.

DISCLOSURE

Technical Problem

An embodiment provides a separator for a secondary battery having improved adherence and durability.

Another embodiment provides a secondary battery including the separator.

Technical Solution

According to an embodiment, a separator for a secondary battery includes a porous substrate and a heat-resistant porous layer positioned on at least one surface of the porous substrate, wherein the heat-resistant porous layer includes a first binder including a copolymer having a first structural unit derived from a first fluorine monomer; a second structural unit derived from a second fluorine monomer; and a third structural unit derived from a monomer including at least one functional group selected from a hydroxyl group, a carboxyl group, an ester group, an acid anhydride group, and a derivative thereof and a second binder including at least one of a vinylidene fluoride homopolymer and a vinylidene fluoride copolymer.

According to another embodiment, provided is a lithium secondary battery including a positive electrode, a negative electrode, and a separator disposed between the positive electrode and the negative electrode.

Advantageous Effects

The separator has improved adherence and durability and thus may improve battery characteristics of a lithium secondary battery.

DESCRIPTION OF THE DRAWINGS

FIG. 1 is a schematic view showing a separator for a separator for a secondary battery according to an embodiment, and FIG. 2 is an exploded perspective view showing a lithium secondary battery according to an embodiment.

MODE FOR INVENTION

Hereinafter, embodiments of the present invention are described in detail. However, these embodiments are exemplary, the present invention is not limited thereto and the present invention is defined by the scope of claims. Hereinafter, a separator for a separator for a secondary battery according to an embodiment is described.

FIG. 1 is a schematic view showing a separator for a secondary battery according to an embodiment.

Referring to FIG. 1, a separator 10 for a secondary battery according to an embodiment includes a porous substrate 20 and a heat-resistance porous layer 30 disposed on one surface or both surfaces of the porous substrate 20.

The porous substrate 20 may have a plurality of pore and may generally be a porous substrate used in an electrochemical device. Non-limiting examples of the porous substrate 20 may be a polymer film formed of a polymer or a mixture of two or more selected from the group consisting of polyolefin such as polyethylene, and polypropylene, polyester such as polyethyleneterephthalate and polybutyleneterephthalate, polyacetal, polyamide, polyimide, polycarbonate, polyetheretherketone, polyaryletherketone, polyetherimide, polyamideimide, polybenzimidazole, polyethersulfone, polyphenyleneoxide, a cyclic olefin copolymer, polyphenylenesulfide, polyethylenenaphthalate, a glass fiber, TEFLON (tetrafluoroethylene), and polytetrafluoroethylene (PTFE). For example, the porous substrate 20 may be a polyolefin-based substrate, and the polyolefin-based substrate may improve has safety of a battery due to its improved shut-down function. The polyolefin-based substrate may be, for example, selected from the group consisting of a polyethylene single film, a polypropylene single film, a polyethylene/polypropylene double film, a polypropylene/polyethylene/polypropylene triple film, and a polyethylene/polypropylene/polyethylene triple film. The polyolefin-based resin may include a non-olefin resin in addition to an olefin resin or a copolymer of olefin and a non-olefin monomer.

The porous substrate 20 may have a thickness of about 1 μm to 20 μm, for example 1 μm to 15 μm, 1 μm to 10 μm or 5 μm to 10 μm.

The heat-resistance porous layer 30 includes a filler and a binder.

The filler may be, for example an inorganic filler, an organic filler, an organic/inorganic filler, or a combination thereof.

The inorganic filler may be a ceramic material capable of improving heat resistance, for example a metal oxide, a semi-metal oxide, a metal fluoride, a metal hydroxide, or a combination thereof. The inorganic filler may be, for example $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, or a combination thereof, but is not limited thereto.

The organic filler may include an acrylic compound, an imide compound, an amide compound, or a combination thereof, but is not limited thereto. The organic filler may have a core-sell structure but is not limited thereto.

The filler may have a particle or a sheet shape having a size of about 1 nm to 2000 nm, within the range a size of about 100 nm to 1000 nm, or within the range, about 100 nm to 500 nm. Herein, the size is an average particle diameter or the longest diameter. When the filler has a size within the range, the heat-resistance layer 30 may have a desirable strength.

The filler may be used by mixing two or more different kinds of fillers or two or more fillers having different sizes.

The filler may improve heat resistance and thus prevent a separator from being sharply contracted or transformed as a temperature is increased.

The binder may play a role of fixing the filler on the porous substrate 20 and simultaneously, adhere the porous substrate 20 on one surface of the heat-resistance porous layer 30 and an electrode (not shown) on the other surface thereof.

The binder includes a first binder and a second binder.

The first binder may be a copolymer obtained from a first fluorine monomer; a second fluorine monomer; and a monomer including at least one functional group selected from a hydroxy group, a carboxyl group, an ester group, an acid anhydride group, and a derivative thereof. Herein, the 'fluorine monomer' refers to a monomer including at least one fluorine atom, for example a monomer having at least one C—F bond, for example a monomer having a moiety represented by $=CF_2$ and/or a moiety represented by $CF_2=CH_2$ in the monomer. Specifically, the first fluorine monomer may be for example vinylidene fluoride and the second fluorine monomer may be for example at least one selected from hexafluoropropylene, chlorotrifluoroethylene (CTFE), tetrafluoroethylene (TFE), trifluoroethylene (TrFE), and vinyl fluoride.

The monomer including the functional group may include for example (meth)acrylic acid or a derivative thereof, (meth)acryloyloxy acetic acid or a derivative thereof, (meth)acryloyloxy alkyl acid or a derivative thereof, itaconic acid or a derivative thereof, maleic acid or a derivative thereof, an ester derivative, a anhydride, or a combination thereof.

The (meth)acrylic acid or the derivative thereof may include for example acrylic acid, methacrylic acid, alkyl acrylate, alkyl methacrylate, hydroxyalkyl acrylate, hydroxyalkyl methacrylate, carboxylalkylacrylate, carboxylalkylmethacrylate, acryloyloxyalkyl succinic acid, methacryloyloxyalkyl succinic acid, acryloyloxyhydrosuccinic acid, methacryloyloxyhydrosuccinic acid, acryloyloxyalkyl phthalic acid, methacryloyloxyalkyl phthalic acid, a derivative thereof, or a combination thereof. The (meth)acrylic acid or the derivative thereof may include for example acrylic acid, methacrylic acid, hydroxyethylacrylate, hydroxyethylmethacrylate, carboxylethylacrylate, carboxylethylmethacrylate, acryloyloxyethyl succinic acid, methacryloyloxyethyl succinic acid, β-acryloyloxyhydrodiene succinate, β-methacryloyloxyhydrodiene succinate, acryloyloxyethyl phthalic acid, methacryloyloxyethyl phthalic acid, a derivative thereof or a combination thereof.

The (meth)acryloyloxy alkyl acid may be for example 3-acryloyloxy propyl acid, 3-methacryloyloxy propyl acid, 4-acryloyloxy butyl acid, 4-methacryloyloxy butyl acid, a derivative thereof, or a combination thereof.

The maleic acid or the derivative thereof may be for example maleic anhydride (2,5-furan dione), 3-methyl-2,5-furan dione, 3-ethyl-2,5-furan dione, 3-propyl-2,5-furan dione, 3-butyl-2,5-furan dione, 3-pentyl-2,5-furan dione, 3-hexyl-2,5-furan dione, 3-heptyl-2,5-furan dione, 3-octyl-2,5-furan dione, a derivative thereof, or a combination thereof.

The ester derivative may be for example citraconic acid alkyl ester, maleic acid alkyl ester, aminoalkylester, vinylester, carbonic acid ester, or a combination thereof, for example citraconic acid monomethyl ester, citraconic acid monoethyl ester, maleic acid monomethyl ester, maleic acid monoethyl ester, acrylic acid 2-(N,N-dimethylamino)ethyl ester, methacrylic acid 2-(N,N-dimethylamino)ethyl ester, propionic acid vinyl ester, vinylene carbonate, a derivative thereof, or a combination thereof.

The anhydride may be for example acetic anhydride, maleic anhydride, citraconic anhydride, itaconic anhydride, or a derivative thereof.

For example, the first binder may be a copolymer including a first structural unit derived from a first fluorine monomer; a second structural unit derived from a second fluorine monomer; and a third structural unit derived from a monomer including at least one functional group selected from a hydroxy group, a carboxyl group, an ester group, an acid anhydride group, and a derivative thereof.

The first structural unit may be for example at least one selected from a vinylidene fluoride-derived structural unit, and the second structural unit may be for example at least one selected from a hexafluoropropylene-derived structural unit, a chlorotrifluoroethylene-derived structural unit, a tetrafluoroethylene-derived structural unit, a trifluoroethylene-derived structural unit, and a vinyl fluoride-derived structural unit.

Herein, a ratio of the first structural unit, the second structural unit, and the third structural unit may be substantially the same as a supply ratio of a first fluorine monomer, a second fluorine monomer, and a monomer including at least one functional group selected from a hydroxy group, a carboxyl group, an ester group, an acid anhydride group, and a derivative thereof.

For example, the first binder may have a structure having the first structural unit as a main backbone and having the second structural unit and the third structural unit that are randomly distributed. For example, the first binder may be an alternate polymer wherein the first to third structural units are alternately distributed, a random polymer wherein they are randomly distributed, or a graft polymer wherein a part of the structural units is grafted, and the like, but is not limited thereto.

Herein, the second structural unit may be included in an amount of about 4 to 10 wt % based on the first binder. When the second structural unit is included within the range, adherence of the heat-resistant porous layer 30 may not only be secured but a solubility in a low boiling point solvent may also be improved. Accordingly the heat-resistance porous layer 30 may be formed by using the low boiling point solvent without a separate additional process, and thus a high boiling point solvent inevitably deteriorating air permeability may not be used. Within the range, the second structural unit may be for example included in an amount of about 5 to 7 wt % based on the first binder.

The low boiling point solvent may be, for example a solvent having a boiling point of less than or equal to about 80° C., for example acetone, methylethylketone, ethylisobutylketone, tetrahydrofuran, dimethylformaldehyde, cyclohexane, or a mixed solvent thereof but is not limited thereto. For example, the copolymer may have solubility of less than or equal to about 20 in a solvent having a boiling point of less than or equal to 80° C. at less than or equal to 40° C.

The third structural unit may be included in an amount of about 1 to 7 wt % based on the first binder. When the third structural unit is included within the range, adherence of the heat-resistance porous layer 30 to the porous substrate 20 and the electrode may be improved. Within the range, the third structural unit may be for example included in an amount of about 1.5 to about 5 wt %.

For example, the second structural unit may be included in the same as or larger amount than that of the third structural unit. For example, the first binder may include the second structural unit and the third structural unit for example in a weight ratio of about 1:1 to about 4:1. When the second structural unit and the third structural unit are included within the ratio, adherence of the heat-resistant porous layer 30 and air permeability may be simultaneously satisfactory.

The first structural unit may be included in an amount except the second structural unit and the third structural unit and may be for example included in an amount of about 83 to 95 wt %. Within the range, it may be for example included in an amount of 88 to 93.5 wt %.

The first binder may have a weight average molecular weight of about 500,000 g/mol to 1,500,000 g/mol, within the range about 600,000 g/mol to 1,200,000 g/mol, or 800,000 g/mol to 1,200,000 g/mol. The first binder the range having a weight average molecular weight within the range may secure adherence of the heat-resistant porous layer 30.

The second binder may include at least one of a vinylidene fluoride homopolymer and a vinylidene fluoride copolymer. Herein, the 'homopolymer' indicates a polymer obtained by polymerizing one kind of monomer, and the 'copolymer' indicates a polymer obtained by polymerizing two or more monomers. In other words, the 'vinylidene fluoride homopolymer' is a polymer obtained by polymerizing a vinylidene fluoride monomer alone, and the 'vinylidene fluoride copolymer' is a polymer obtained by polymerizing vinylidene fluoride as a monomer with one or more monomers differing therefrom.

For example, the second binder may include the vinylidene fluoride homopolymer. The vinylidene fluoride homopolymer is a polymer that a structural unit derived from vinylidene fluoride is repeated. The vinylidene fluoride homopolymer may have a weight average molecular weight ranging from 400,000 g/mol to 1,500,000 g/mol and within the range, a weight average molecular weight ranging from about 600,000 g/mol to 1,200,000 g/mol.

For example, the second binder may include the vinylidene fluoride copolymer, and the vinylidene fluoride copolymer may be for example a copolymer obtained by copolymerizing monomers including a vinylidene fluoride monomer and a hexafluoropropylene monomer. The copolymer may include a vinylidene fluoride-derived structural unit and a hexafluoropropylene-derived structural unit. Herein, a ratio of the vinylidene fluoride-derived structural unit and the hexafluoropropylene-derived structural unit may be substantially the same as a supply ratio of a vinylidene fluoride monomer and a hexafluoropropylene monomer.

For example, the copolymer may have a structure have a structure having a vinylidene fluoride-derived structural unit as a main backbone and having a hexafluoropropylene-derived structure that is randomly distributed. Herein, the hexafluoropropylene-derived structural unit may be included in an amount of about 1 to 10 mol % based on the binary copolymer. When the hexafluoropropylene-derived structural unit is included within the range, adherence of the heat-resistance porous layer 30 may not only be secured but solubility in a low boiling point solvent may also be improved. Accordingly the heat-resistance porous layer 30 may be formed by using the low boiling point solvent without a separate additional process, and thus a high boiling point solvent inevitably deteriorating air permeability may not be used. Within the range, the hexafluoropropylene-derived structural unit may be for example included in an amount of about 1 to 7 mol % based on the copolymer.

An amount of the vinylidene fluoride-derived structural unit may exclude that of the hexafluoropropylene-derived structural unit and for example, range from about 75.0 to 99.9 wt %. Within the range, the vinylidene fluoride-derived structural unit may be included for example in an amount of 88 to 99 wt %.

The copolymer may have a weight average molecular weight ranging from about 500,000 g/mol to 1,500,000 g/mol and within the range, a weight average molecular weight ranging from about 500,000 g/mol to 1,200,000 g/mol. The second binder having a weight average molecular weight within the range may secure adherence of the heat-resistant porous layer 30.

For example, the second binder may include a vinylidene fluoride homopolymer and a copolymer including a vinylidene fluoride-derived structural unit and a hexafluoropropylene-derived structural unit.

The first binder and the second binder may be for example included in a weight ratio of 1:9 to 9:1. Within the range, it may be for example included in a weight ratio of 2:8 to 8:2, within the range, it may be for example included in a weight ratio of 3:7 to 7:3, or within the range, it may be for example included in a weight ratio of 5:5 to 7:3.

The binder and the filler may be for example included in a weight ratio of about 1:9 to 2:1. When the binder and the filler are included within the range, the separator may secure heat resistance and thus be prevented from deformation due to a temperature increase. For example, the binder and the filler may be included in a weight ratio of about 1:9, about 1:7, about 1:5, about 1:3, about 1:1, about 3:1, or about 2:1 but are not limited thereto. Within the ranges, the binder and the filler may be included for example in a weight ratio of about 1:7 to 2:1, and within the ranges, in a weight ratio of about 1:7 to 1:1.

The binder may further include one or more kinds of third binder in addition to the first binder and the second binder.

A heat-resistant porous layer 30 may have a thickness of about 0.01 μm to 20 μm, within the range, a thickness of about 1 μm to 10 μm, and within the range, a thickness of about 1 μm to 5 μm.

The separator for a secondary battery may be for example formed by coating a composition for a heat-resistance porous layer on one surface or both surfaces of the porous substrate 20 and then, drying it.

The composition for a heat-resistance porous layer may include the binder, the filler, and a solvent. The solvent may be any solvent that dissolve or disperse the binder and the filler without particular limit. The solvent may be, for example a low boiling point solvent having a boiling point of less than or equal to about 80° C., for example acetone, methylethylketone, ethylisobutylketone, tetrahydrofuran, dimethylformaldehyde, cyclohexane or a mixed solvent thereof, but is not limited thereto.

The coating may be, for example, a spin coating, a dip coating, a bar coating, a die coating, a slit coating, a roll coating, an inkjet printing, and the like, but is not limited thereto.

The drying may be, for example, performed through drying with warm air, hot air, or low humid air, vacuum-drying, or radiation of a far-infrared ray, an electron beam, and the like, but the present disclosure is not limited thereto. The drying may be, for example, performed at a temperature of 25° C. to 120° C.

The separator for a secondary battery may be made using a method of lamination, coextrusion, and the like in addition to the method.

Hereinafter, a lithium secondary battery including the separator for a secondary battery is described.

A lithium secondary battery may be classified into a lithium ion battery, a lithium ion polymer battery, and a lithium polymer battery depending on kinds of a separator and an electrolyte and it may be classified to be cylindrical, prismatic, coin-type, pouch-type, and the like depending on shape and may be bulk type and thin film type depending on sizes. Structures and manufacturing methods for the batteries pertaining to this disclosure are well known in the art.

Herein, as an example of a lithium secondary battery, a prismatic lithium secondary battery is for example described.

FIG. 2 is an exploded perspective view showing a lithium secondary battery according to an embodiment.

Referring to FIG. 2, a lithium secondary battery 100 according to an embodiment includes an electrode assembly 60 manufactured by interposing a separator 10 between a positive electrode 40 and a negative electrode 50 and winding them, and a case 70 housing the electrode assembly 60.

The electrode assembly 60 may have for example a jelly-roll shape formed by winding the positive electrode 40, the negative electrode 50, and the separator 10 interposed therebetween.

The positive electrode 40, the negative electrode 50, and the separator 10 are impregnated in an electrolyte solution (not shown).

The positive electrode 40 includes a positive current collector and a positive active material layer formed on the positive current collector. The positive active material layer includes a positive active material, a binder, and optionally a conductive material.

The positive current collector may use aluminum (Al), nickel (Ni), and the like, but is not limited thereto.

The positive active material may use a compound being capable of intercalating and deintercalating lithium. Specifically at least one of a composite oxide or a composite phosphate of a metal selected from cobalt, manganese, nickel, aluminum, iron, or a combination thereof and lithium may be used. More specifically, the positive active material may use a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

The binder improves binding properties of positive active material particles with one another and with a current collector, and specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material improves conductivity of an electrode and examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 50 includes a negative current collector and a negative active material layer formed on the negative current collector.

The negative current collector may use copper (Cu), gold (Au), nickel (Ni), a copper alloy, and the like, but is not limited thereto.

The negative active material layer may include a negative active material, a binder and optionally a conductive material.

The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be graphite such as amorphous, sheet-shape, flake, spherical shape or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from the group consisting of Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si—Y alloy, Sn, $SnO_2$, a Sn—C composite, a Sn—Y alloy, and the like, and at least one of these may be mixed with $SiO_2$. Specific examples of the element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, and a combination thereof. The transition metal oxide may be vanadium oxide, lithium vanadium oxide, and the like.

The binder and the conductive material used in the negative electrode may be the same as the binder and conductive material of the positive electrode.

The positive electrode 40 and the negative electrode 50 may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known and thus is not described in detail in the present specification.

The separator 10 is the same as described above.

The electrolyte solution includes an organic solvent and a lithium salt.

The organic solvent serves as a medium for transmitting ions taking part in the electrochemical reaction of a battery. Specific examples thereof may be selected from a carbonate-based solvent, an ester-based solvent, an ether-based solvent, a ketone-based solvent, an alcohol-based solvent, and an aprotic solvent.

The organic solvent may be for example a carbonate-based, ester-based, ether-based, ketone-based, alcohol-based, or aprotic solvent. The carbonate-based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like. The alcohol-based solvent may be ethanol, isopropyl alcohol, and the like, and the aprotic solvent may be nitriles such as R—CN (R is a C2 to C20 linear or branched or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the lithium secondary battery, and improves lithium ion transportation between positive and negative electrodes therein. Examples of the lithium salt may include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof but is not limited thereto.

The lithium salt may be used in a concentration ranging from 0.1 M to 2.0 M. When the lithium salt is included within the above concentration range, an electrolyte solution may have excellent performance and lithium ion mobility due to optimal electrolyte conductivity and viscosity.

The lithium secondary battery including the separator may be operated at a high voltage of greater than or equal to about 4.2 V, thus a lithium secondary battery having a high capacity may be accomplished without the deterioration of cycle life characteristics.

Hereinafter, the above aspects of the present disclosure are illustrated in more detail with reference to examples. However, these examples are exemplary, and the present disclosure is not limited thereto.

Synthesis of First Binder

Synthesis Example 1

1295 g of desalted water, 0.75 g of methyl cellulose, 4.0 g of propylperoxydicarbonate, 467.8 g of vinylidene fluoride (VDF), 24.8 g of hexafluoropropylene (HFP), and 7.4 g of acrylic acid (AA) were put in a 1 L autoclave reactor and then, suspension-polymerized at 28° C. for 60 hours. When the polymerization was complete, after degasing the suspended solution, the obtained polymer slurry was dehydrated, washed, and dehydrated again and then, dried in an 80° C. oven for 24 hours to obtain a copolymer. A weight average molecular weight of the obtained copolymer was 1,120,000 g/mol.

Synthesis Example 2

1295 g of desalted water, 0.75 g of methyl cellulose, 4.0 g of propylperoxydicarbonate, 465.0 g of vinylidene fluoride (VDF), 25.0 g of hexafluoropropylene (HFP), and 10.0 g of hydroxyethylacrylate (HEA) were put in a 1 L autoclave reactor and suspension-polymerized at 28° C. for 60 hours. When the polymerization was complete, after degasing the suspended solution, the obtained polymer slurry was dehydrated, washed, and dehydrated and then, dried in an 80° C. oven for 24 hours to obtain a copolymer. A weight average molecular weight of the copolymer was 1,115,000 g/mol.

Synthesis Example 3

1295 g of desalted water, 0.75 g of methyl cellulose, 4.0 g of propylperoxydicarbonate, 450.0 g of vinylidene fluoride (VDF), 35.0 g of hexafluoropropylene (HFP), and 15.0 g of hydroxybutylacrylate (HBA) were put in a 1 L autoclave reactor and then, suspension-polymerized at 28° C. for 60 hours. When the polymerization was complete, after degasing the suspended solution, the obtained polymer slurry was dehydrated, washed, and dehydrated and then, dried in an 80° C. oven for 24 hours to obtain a copolymer. A weight average molecular weight of the copolymer was 1,103,000 g/mol.

Synthesis Example 4

1295 g of desalted water, 0.75 g of methyl cellulose, 4.0 g of propylperoxydicarbonate, 450.0 g of vinylidene fluoride (VDF), 25.0 g of hexafluoropropylene (HFP), and 25.0 g of maleic anhydride were put in a 1 L autoclave reactor and then, suspension-polymerized at 28° C. for 60 hours. When the polymerization was complete, after degasing the obtained suspension, the obtained polymer slurry was dehydrated, washed, and dehydrated, and then dried in an 80° C. oven for 24 hours to obtain a copolymer. A weight average molecular weight of the copolymer was 1,001,000 g/mol.

Evaluation 1

A composition ratio, a melting point (Tm), and inherent viscosity (η) of each copolymer according to Synthesis Examples 1 to 4 were shown in Table 1. The melting point was measured with a differential scanning calorimeter (DSC), and the inherent viscosity was obtained by measuring capillary viscosity with an Ubbelohde viscometer.

TABLE 1

| | Copolymer | Composition ratio | Tm (° C.) | η (dl/g) |
| --- | --- | --- | --- | --- |
| Synthesis Example 1 | VDF/HFP/AA | 93.5/5/1.5 | 165 | 3.43 |
| Synthesis Example 2 | VDF/HFP/HEA | 93/5/2 | 164 | 3.50 |
| Synthesis Example 3 | VDF/HFP/HBA | 90/7/3 | 163 | 3.47 |
| Synthesis Example 4 | VDF/HFP/MAA | 90/5/5 | 162 | 3.40 |

Evaluation 2

Solubility of each copolymer according to Synthesis Examples 1 to 4 about a low boiling point solvent was evaluated.

The solubility in a low boiling point solvent was evaluated by mixing each copolymer of Synthesis Examples with acetone to have a solid content of 10 wt % and stirring the mixture at room temperature for 60 minutes and then, examining whether or not non-dissolved gel was present.

The results are shown in Table 2.

TABLE 2

| | Presence of non-dissolved gel |
| --- | --- |
| Synthesis Example 1 | X |
| Synthesis Example 2 | X |
| Synthesis Example 3 | X |
| Synthesis Example 4 | X |

Referring to Table 2, the copolymers of Synthesis Examples 1 to 4 were well dissolved in acetone having a low boiling point, and thus a non-dissolved gel was not present. Accordingly, the copolymers of Synthesis Examples 1 to 4 turned out to have high solubility about acetone.

Manufacture of Separator

Example 1

A binder solution was prepared by dissolving the copolymer according to Synthesis Example 1 in acetone to prepare a solution having a solid content of 5 wt % and adding a polyvinylidene fluoride copolymer (hexafluoropropylene (HFP), 1 mol %, Mw=1,000,000 g/mol, KF-9300, Kureha) thereto in a weight ratio of 5:5 between the copolymer according to Synthesis Example 1 and the polyvinylidene fluoride copolymer. Subsequently, an inorganic dispersion was prepared by adding 500 nm alumina (LS235A, Nippon Light Metal Company, Ltd.) in a concentration of 25 wt % to acetone and milling the mixture at 25° C. for 3 hours with a bead mill. Subsequently, the binder solution and the inorganic dispersion were mixed in a weight ratio of 1:5 between the binder solid and the alumina solid and adding acetone thereto to have the total solid content of 12 wt % to obtain a composition.

The composition was dip-coated to be 3 μm thick on a 9 μm-thick polyethylene substrate (SK Innovation Co.) and then, dried at 100° C. for 30 seconds to manufacture a separator.

Example 2

A separator was manufactured according to the same method as Example 1 except for using the polyvinylidene fluoride copolymer (HFP, 1 mol %, KF-9300, Kureha) in a weight ratio of 7:3 between the copolymer according to Synthesis Example 1 and the polyvinylidene fluoride copolymer.

Example 3

A separator was manufactured according to the same method as Example 1 except for using a polyvinylidene fluoride copolymer (HFP, 5 to 6 mol %, Mw=570,000 to 600,000 g/mol, Solef 21216, Solvey) instead of the polyvinylidene fluoride copolymer (HFP, 1 mol %, KF-9300, Kureha).

Example 4

A separator was manufactured according to the same method as Example 1 except for using a polyvinylidene fluoride copolymer (HFP, 5 to 6 mol %, Solef 21216, Solvey) instead of the polyvinylidene fluoride copolymer (HFP, 1 mol %, KF-9300, Kureha) and mixing it with the copolymer according to Synthesis Example 1 in a weight ratio of 7:3 between the copolymer according to Synthesis Example 1 and the polyvinylidene fluoride copolymer (HFP, 5 to 6 mol %, Solef 21216, Solvey).

Example 5

A separator was manufactured according to the same method as Example 1 except for using a polyvinylidene fluoride copolymer (HFP, 2 mol %, Mw=600,000 g/mol, Kynar LBG, Arkema) instead of the polyvinylidene fluoride copolymer (HFP, 1 mol %, KF-9300, Kureha).

Example 6

A separator was manufactured according to the same method as Example 1 except for using a polyvinylidene fluoride homopolymer (Mw=670,000 to 700,000 g/mol, Solef 6020, Solvey) instead of the polyvinylidene fluoride copolymer (HFP, 1 mol %, KF-9300, Kureha).

Example 7

A separator was manufactured according to the same method as Example 1 except for using a polyvinylidene fluoride homopolymer (Mw=800,000 to 900,000 g/mol, Kynar HSV800, Arkema) instead of the polyvinylidene fluoride copolymer (HFP, 1 mol %, KF-9300, Kureha).

Example 8

A separator was manufactured according to the same method as Example 1 except for using the copolymer according to Synthesis Example 2 instead of the according to Synthesis Example 1.

Example 9

A separator was manufactured according to the same method as Example 1 except for using the copolymer according to Synthesis Example 3 instead of the copolymer according to Synthesis Example 1 and a polyvinylidene fluoride copolymer (HFP, 5 to 6 mol %, Solef 21216, Solvey) instead of the polyvinylidene fluoride copolymer (HFP, 1 mol %, KF-9300, Kureha).

Example 10

A separator was manufactured according to the same method as Example 1 except for using the copolymer according to Synthesis Example 4 instead of the copolymer according to Synthesis Example 1.

Comparative Example 1

A separator was manufactured according to the same method as Example 1 except for using a polyvinylidene fluoride copolymer (HFP, 15 mol % Mw=290,000 to 310,000 g/mol, Solef 21510, Solvay) instead of the copolymer according to Synthesis Example 1.

Comparative Example 2

A separator was manufactured according to the same method as Example 1 except for using a polyvinylidene fluoride copolymer (Solef 21510, Solvay) and a polyvinylidene fluoride copolymer (HFP, 7 to 8 mol %, Mw=600,000-700,000 g/mol, Kynar Flex 2851, Arkema) instead of the copolymer according to Synthesis Example 1 and the polyvinylidene fluoride copolymer (HFP, 1 mol %, KF-9300, Kureha).

Evaluation 3

Air permeability of each separator according to Examples 1 to 10 and Comparative Examples 1 and 2 was measured in the following method, a transfer rate, a thickness variation ratio after charge and discharge, and capacity retention of lithium secondary battery cells respectively manufactured by applying the separator were measured in the following method.

(1) Air Permeability of Separator

The separators according to Examples 1 to 10 and Comparative Examples 1 and 2 were respectively cut into a size of 100 mm×100 mm in a MD direction and a TD direction, and their air permeability was measured regarding how long it takes for the cut separators to pass 100 cc of air (unit: a second) by using an air permeability tester equipment (EG01-55-1MR, Asahi Seico Co., Ltd.). The air-passing time measurement was respectively five times repeated and then, averaged to obtain the air permeability.

(2) Transfer Rate, Capacity Retention, and Thickness Variation Ratio of Lithium Secondary Battery 1) Manufacture of Lithium Secondary Battery and Charge and Discharge A 108 μm-thick positive electrode was manufactured by coating $LiCoO_2$ as a positive active material to be 94 μm thick on both surfaces of a 14 μm-thick aluminum foil and then, drying and rolling the coated aluminum foil. A negative electrode having a total thickness of 128 μm was manufactured by coating natural graphite and artificial graphite in a ratio of 1:1 as a negative active material to be 120 μm thick on an 8 μm-thick copper foil and then, drying and rolling the coated copper foil. An electrolyte solution was prepared by adding 0.2% of LiBF4, 5.0% of fluoroethylene carbonate (FEC), 1.0% of vinylene carbonate (VC), 3.00% of succinonitrile (SN), 1.0% of 1,3-propane sultone (PS), 1.0% of succinic anhydride (SA), and 1.5 M $LiPF_6$ (PANAX ETEC Co., Ltd.) in a mixed solvent of ethylenecarbonate (EC)/ethylmethylcarbonate (EMC)/diethylcarbonate (DEC) in a volume ratio of 3:5:2.

The separators according to Examples and Comparative Examples were respectively disposed between the positive electrode and the negative electrode and wound therewith into each 7 cm×6.5 cm electrode assembly. The electrode assembly was primarily pressed under a pressure of 5 kgf/cm$^2$ at 100° C. for 3 seconds and then put in an aluminum coating pouch (8 cm×12 cm), 6.5 g of the electrolyte solution was put in the pouch after sealing two neighboring edges at 143° C., and the pouch was sealed by using a degassing machine for greater than or equal to 3 minutes, so that air inside the battery was not left. The manufactured battery cells were primarily aged at 25° C. for 12 hours and secondarily compressed under a pressure of 20 kgf/cm$^2$ at 110° C. for 120 seconds. Subsequently, the battery cells were aged again at 25° C. for 12 hours and then, pre-charged at 4.35 V and 0.2 C for 1 hour, and after removing gas in the battery cells, the battery cells were 500 cycles charged and discharged under the following condition.

Charge Condition: 4.35 V, 0.2 C, 50 mA cut-off/5 hours
Discharge Condition: 0.2 C, 3 V cut-off/5 hours 2) Transfer Rate Evaluation The lithium secondary battery cells were respectively decomposed, and an area where the active material of the negative electrode or the positive electrode was transferred into each separator was taken a photograph of by using a high resolution camera (Lumenera Corp.) and calculated by using an image analyzer (Easy Measure converter 1.0.0.4), and a transfer rate of the separator was calculated according to Calculation Equation 1.

$$\text{Transfer Rate (\%)}=(A_1/A_0)\times 100 \quad \text{[Calculation Equation 1]}$$

In Calculation Equation 1, $A_0$ denotes an entire area of a negative electrode or a positive electrode, $A_1$ denotes an area of a positive active material or a negative active material transferred into the separator when charging, discharging, and charging an electrode assembly formed by sequentially stacking a positive electrode, a separator, and a negative electrode and compressing them.

3) Evaluation of Thickness Variation Ratio

A thickness variation ratio was evaluated as a percentage by comparing a thickness of the lithium secondary battery when its formation was finished after the assembly with a thickness of the battery after 500 times charged and discharged.

4) Capacity Retention

Capacity retention of the lithium secondary battery was evaluated by comparing initial capacity of the lithium secondary with capacity after 500 times charged and discharged.

The results are shown in Table 3.

TABLE 3

| | First binder/second binder (wt:wt) | Air permeability (sec/100 cc) | Transfer rate (%) | Thickness variation ratio (%) | Capacity retention (%) |
|---|---|---|---|---|---|
| Example 1 | Synthesis Example 1/KF-9300 5:5 | 280 | 50 | 6 | 88.9 |
| Example 2 | Synthesis Example 1/KF-9300 7:3 | 260 | 45 | 7 | 89.1 |
| Example 3 | Synthesis Example 1/Solef 21216 5:5 | 230 | 40 | 7 | 89.3 |
| Example 4 | Synthesis Example 1/Solef 21216 7:3 | 225 | 40 | 7 | 89.3 |
| Example 5 | Synthesis Example 1/Kynar LBG 5:5 | 220 | 40 | 7 | 89.4 |
| Example 6 | Synthesis Example 1/Solef6020 5:5 | 280 | 45 | 7 | 89.0 |
| Example 7 | Synthesis Example 1/KynarHSV800 5:5 | 280 | 45 | 7 | 89.0 |
| Example 8 | Synthesis Example 2/KF-9300 5:5 | 290 | 35 | 12 | 88.7 |

TABLE 3-continued

|  | First binder/second binder (wt:wt) | Air permeability (sec/100 cc) | Transfer rate (%) | Thickness variation ratio (%) | Capacity retention (%) |
|---|---|---|---|---|---|
| Example 9 | Synthesis Example 3/Solef 21216 5:5 | 225 | 35 | 11 | 88.6 |
| Example 10 | Synthesis Example4/ KF-9300 5:5 | 280 | 35 | 12 | 88.5 |
| Comparative Example 1 | Solef 21510/KF-9300 5:5 | 300 | 15 | 17 | 77.9 |
| Comparative Example 2 | Solef 21510/Kynar Flex 2851 5:5 | 300 | 15 | 19 | 75.4 |

*Air permeability of a polyethylene substrate: 150 seconds

Referring to Table 3, the separators according to Examples showed excellent air permeability compared with the separators according to Comparative Examples, and the lithium secondary battery cells manufactured by respectively applying the separators showed a satisfactory adherence force, thickness variation ratio, and capacity retention after charge and discharge compared with the lithium secondary battery cells manufactured by respectively applying the separators according to Comparative Examples.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: separator
20: porous substrate
30: heat-resistant layer
40: positive electrode
50: negative electrode
60: electrode assembly
70: case

The invention claimed is:

1. A separator for a secondary battery, comprising
a porous substrate and
a heat-resistant porous layer positioned on at least one surface of the porous substrate,
wherein the heat-resistant porous layer includes
a first binder including a copolymer consisting of a first structural unit derived from vinylidene fluoride; a second structural unit derived from hexafluoropropylene; and a third structural unit derived from (meth)acrylic acid or a derivative thereof, (meth)acryloyloxy acetic acid or a derivative thereof, (meth)acryloyloxy alkyl acid or a derivative thereof, itaconic acid or a derivative thereof, or a combination thereof, and
a second binder including at least one of a vinylidene fluoride homopolymer and a copolymer of vinylidene fluoride and hexafluoropropylene.

2. The separator for a secondary battery of claim 1, wherein the first binder includes 4 to 10 wt % of the second structural unit and 1 to 7 wt % of the third structural unit.

3. The separator for a secondary battery of claim 2, wherein the first binder includes 5 to 7 wt % of the second structural unit and 1.5 to 5 wt % of the third structural unit.

4. The separator for a secondary battery of claim 1, wherein the first binder includes the second structural unit and the third structural unit in a weight ratio of 1:1 to 4:1.

5. The separator for a secondary battery of claim 1, wherein the second binder includes the copolymer of vinylidene fluoride and hexafluoropropylene, and
the copolymer includes 1 to 10 mol % of the hexafluoropropylene-derived structural unit.

6. The separator for a secondary battery of claim 1, wherein the second binder includes the copolymer of vinylidene fluoride and hexafluoropropylene, and
the copolymer includes 1 to 7 mol % of the hexafluoropropylene-derived structural unit 1 to 7 mol %.

7. The separator for a secondary battery of claim 1, wherein the first binder and the second binder are included in a weight ratio of 1:9 to 9:1.

8. The separator for a secondary battery of claim 1, wherein the heat-resistant porous layer includes a filler, and
the filler includes a metal oxide, a semi-metal oxide, a metal fluoride, a metal hydroxide, an acrylic compound, an imide compound, an amide compound, or a combination thereof.

9. The separator for a secondary battery of claim 8, wherein the filler includes $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, or a combination thereof.

10. The separator for a secondary battery of claim 1, wherein the porous substrate includes polyolefin.

11. A lithium secondary battery, comprising
a positive electrode,
a negative electrode, and
the separator of claim 1 disposed between the positive electrode and the negative electrode.

* * * * *